US012572987B2

(12) United States Patent
Xu et al.

(10) Patent No.: US 12,572,987 B2
(45) Date of Patent: Mar. 10, 2026

(54) METHOD AND DEVICE FOR OPTIMIZING PRODUCTION SCHEDULING BASED ON CAPACITY OF BOTTLENECK APPARATUS, AND MEDIUM

(71) Applicant: INSPUR GENERSOFT CO., LTD., Jinan (CN)

(72) Inventors: Tongming Xu, Jinan (CN); Haiyang Lu, Jinan (CN); Junli Xue, Jinan (CN); Hui Lin, Jinan (CN); Jing Zhu, Jinan (CN); Bozhao Li, Jinan (CN); Jinning Wu, Jinan (CN); Pingting Ma, Jinan (CN)

(73) Assignee: INSPUR GENERSOFT CO., LTD., Jinan (CN)

( * ) Notice: Subject to any disclaimer, the term of this patent is extended or adjusted under 35 U.S.C. 154(b) by 0 days.

(21) Appl. No.: 18/813,078

(22) Filed: Aug. 23, 2024

(65) Prior Publication Data

US 2024/0420256 A1 Dec. 19, 2024

Related U.S. Application Data

(63) Continuation of application No. PCT/CN2024/080167, filed on Mar. 5, 2024.

(30) Foreign Application Priority Data

Mar. 6, 2023 (CN) .......................... 202310200232.0

(51) Int. Cl.
*G06Q 50/04* (2012.01)
*G06Q 10/0631* (2023.01)
(52) U.S. Cl.
CPC ....... *G06Q 50/04* (2013.01); *G06Q 10/06312* (2013.01)

(58) Field of Classification Search
CPC .. G06Q 50/04; G06Q 10/06312; G06Q 10/06; G06F 19/00; G05B 19/41865
(Continued)

(56) References Cited

U.S. PATENT DOCUMENTS

| | | | |
|---|---|---|---|
| 6,278,901 B1 * | 8/2001 | Winner | .................. G06Q 10/06 700/99 |
| 2003/0130756 A1 * | 7/2003 | Baweja | ............ G05B 19/41865 700/103 |

(Continued)

FOREIGN PATENT DOCUMENTS

| | | |
|---|---|---|
| CN | 103530702 A | 1/2014 |
| CN | 103676881 A | 3/2014 |

(Continued)

OTHER PUBLICATIONS

Jijie Deng, et al., A bottleneck prediction and rolling horizon scheme combined dynamic scheduling algorithm for semiconductor wafer fabrication, IEEE, 2014, pp. 58-63.

(Continued)

*Primary Examiner* — Rutao Wu
*Assistant Examiner* — Stephen S Swartz
(74) *Attorney, Agent, or Firm* — Bayramoglu Law Offices LLC

(57) ABSTRACT

The provided are a method and device for optimizing production scheduling, and a medium. The method includes: determining an apparatus that has a highest apparatus load rate as a bottleneck apparatus to be adjusted, and obtaining a plurality of producible product models corresponding to the bottleneck apparatus to be adjusted and a plurality of bottleneck apparatuses to be allocated that perform co-production with the bottleneck apparatus to be adjusted; determining an apparatus cluster and a product cluster corresponding to the bottleneck apparatus to be adjusted;

(Continued)

and obtaining a spare working hour of each bottleneck apparatus to be adjusted and a total surplus working hour thereof, determining an adjustment rate of the bottleneck apparatus to be adjusted according to the spare working hour, and allocating working hours of the producible product models based on the adjustment rate and the total surplus working hour.

7 Claims, 3 Drawing Sheets

(58) Field of Classification Search
USPC .................. 705/7.22, 7.29; 700/99, 100, 101
See application file for complete search history.

(56) References Cited

U.S. PATENT DOCUMENTS

| | | | | |
|---|---|---|---|---|
| 2004/0186765 A1 * | 9/2004 | Kataoka | ................. | G06Q 10/06 |
| | | | | 705/7.29 |
| 2005/0114202 A1 * | 5/2005 | Chua | ..................... | G06Q 10/06 |
| | | | | 700/101 |
| 2006/0025877 A1 * | 2/2006 | Watanabe | ........ | G05B 19/41865 |
| | | | | 700/99 |
| 2009/0319415 A1 * | 12/2009 | Stoilov | .................. | G06Q 40/04 |
| | | | | 705/37 |
| 2018/0150066 A1 * | 5/2018 | Chen | ................ | G05B 19/41865 |

| | | | | |
|---|---|---|---|---|
| 2018/0348743 A1 | 12/2018 | Norman | | |
| 2022/0291658 A1 * | 9/2022 | Yeh | ..................... | G05B 19/4097 |
| 2024/0249226 A1 * | 7/2024 | Megannon | ............. | G06Q 10/06 |

FOREIGN PATENT DOCUMENTS

| | | | |
|---|---|---|---|
| CN | 104077633 A | 10/2014 |
| CN | 109636011 A | 4/2019 |
| CN | 110298578 A | 10/2019 |
| CN | 111062535 A | 4/2020 |
| CN | 112907156 A | 6/2021 |
| CN | 113344367 A | 9/2021 |
| CN | 113408915 A | 9/2021 |
| CN | 115660243 A | 1/2023 |
| CN | 116070876 A | 5/2023 |
| JP | 2012168746 A | 9/2012 |

OTHER PUBLICATIONS

Yan Xia, Research and follow-up equipment resource allocation optimization method based on collaborative manufacturing multi-task, Mechanical Manufacturing, 2017, pp. 117-120, vol. 55 No. 637.

Lu Yuan, et al., The Analysis and Optimization of Equipment Dynamic Load Rate in Flexible Automatic Production Line, Modular Machine Tool & Automatic Manufacturing Technique, 2017, pp. 65-67,77, No. 7.

* cited by examiner

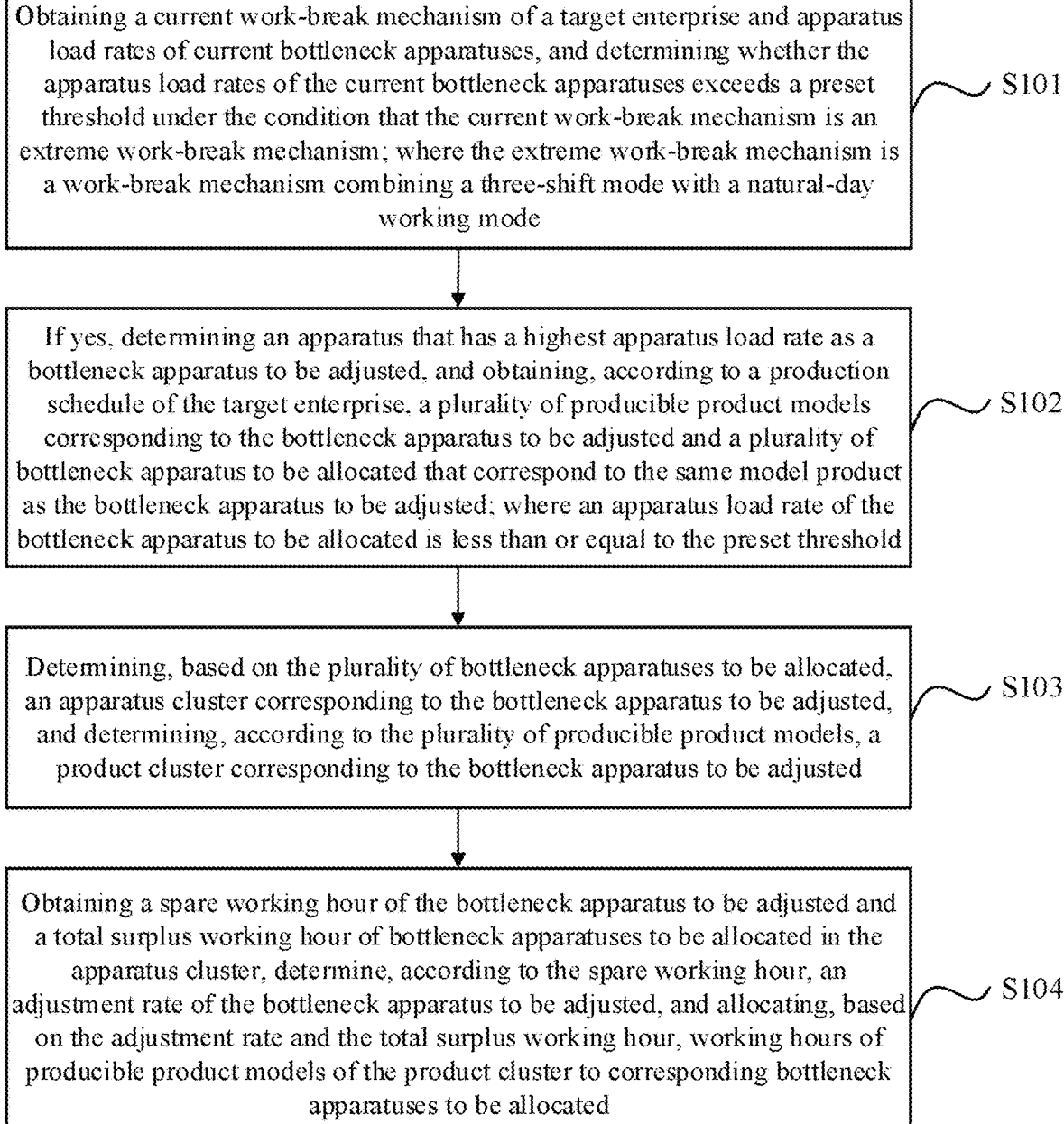

Obtaining a current work-break mechanism of a target enterprise and apparatus load rates of current bottleneck apparatuses, and determining whether the apparatus load rates of the current bottleneck apparatuses exceeds a preset threshold under the condition that the current work-break mechanism is an extreme work-break mechanism; where the extreme work-break mechanism is a work-break mechanism combining a three-shift mode with a natural-day working mode    S101

If yes, determining an apparatus that has a highest apparatus load rate as a bottleneck apparatus to be adjusted, and obtaining, according to a production schedule of the target enterprise, a plurality of producible product models corresponding to the bottleneck apparatus to be adjusted and a plurality of bottleneck apparatus to be allocated that correspond to the same model product as the bottleneck apparatus to be adjusted; where an apparatus load rate of the bottleneck apparatus to be allocated is less than or equal to the preset threshold    S102

Determining, based on the plurality of bottleneck apparatuses to be allocated, an apparatus cluster corresponding to the bottleneck apparatus to be adjusted, and determining, according to the plurality of producible product models, a product cluster corresponding to the bottleneck apparatus to be adjusted    S103

Obtaining a spare working hour of the bottleneck apparatus to be adjusted and a total surplus working hour of bottleneck apparatuses to be allocated in the apparatus cluster, determine, according to the spare working hour, an adjustment rate of the bottleneck apparatus to be adjusted, and allocating, based on the adjustment rate and the total surplus working hour, working hours of producible product models of the product cluster to corresponding bottleneck apparatuses to be allocated    S104

FIG. 1

Serial mode                    Parallel mode

Device for optimizing production scheduling based on a capacity of a bottleneck apparatus Processor Bus Memory Non-volatile storage medium Computer-executable instruction

METHOD AND DEVICE FOR OPTIMIZING PRODUCTION SCHEDULING BASED ON CAPACITY OF BOTTLENECK APPARATUS, AND MEDIUM

CROSS-REFERENCE TO THE RELATED APPLICATIONS

This application is a continuation application of International Application No. PCT/CN2024/080167, filed on Mar. 5, 2024, which is based upon and claims priority to Chinese Patent Application No. 202310200232.0, filed on Mar. 6, 2023, the entire contents of which are incorporated herein by reference.

TECHNICAL FIELD

The disclosure relates to the technical field of production scheduling and control, in particular to a method and device for optimizing production scheduling based on a capacity of a bottleneck apparatus, and a medium.

BACKGROUND

A production schedule is a plan to make an overall arrangement of enterprise production tasks. It is a crucial component of enterprise business plan and a fundamental basis for enterprise production management. In general, a manufacturing enterprise formulates a master production schedule (MPS), and produces products based on the MPS. For the manufacturing enterprise, a capacity of a bottleneck apparatus plays a vital role in the implementation of the MPS.

Since the capacity of the bottleneck apparatus is evaluated roughly by an existing method for evaluating the capacity or a load rate of the bottleneck apparatus, it is difficult to implement optimization of production scheduling based on the capacity. When the load rate of the bottleneck apparatus rises excessively or gets unbalanced due to unreasonable production schedules, a capacity of some bottleneck apparatuses with a low load rate in the enterprise is likely to be underused. In addition, balance on the load rate of the bottleneck apparatus is far from satisfactory since the existing method fails to fully employ capacities of co-producing bottleneck apparatuses based on optimization of production scheduling in the case of parallel production in an existing production enterprise.

SUMMARY

In order to solve the technical problems, one or more examples of the disclosure provide a method and device for optimizing production scheduling based on a capacity of a bottleneck apparatus, and a medium.

One or more examples of the disclosure use the following technical solution:

One or more examples of the disclosure provide a method for optimizing production scheduling based on a capacity of a bottleneck apparatus. The method includes:

obtaining a current work-break mechanism of a target enterprise and apparatus load rates of current bottleneck apparatuses, and determining whether the apparatus load rates of the current bottleneck apparatuses exceeds a preset threshold under the condition that the current work-break mechanism is an extreme work-break mechanism; where the extreme work-break mechanism is a work-break mechanism combining a three-shift mode with a natural-day working mode;

if the apparatus load rates of the current bottleneck apparatuses exceeds the preset threshold, determining an apparatus that has a highest apparatus load rate as a bottleneck apparatus to be adjusted, and obtaining, according to a production schedule of the target enterprise, a plurality of producible product models corresponding to the bottleneck apparatus to be adjusted and a plurality of bottleneck apparatus to be allocated that correspond to the same model product as the bottleneck apparatus to be adjusted; where an apparatus load rate of the bottleneck apparatus to be allocated is less than or equal to the preset threshold;

determining, based on the plurality of bottleneck apparatuses to be allocated, an apparatus cluster corresponding to the bottleneck apparatus to be adjusted, and determining, according to products co-produced by the bottleneck apparatus to be adjusted and the plurality of the bottleneck apparatuses to be allocated, a product cluster corresponding to the bottleneck apparatus to be adjusted; and obtaining a spare working hour of the bottleneck apparatus to be adjusted and a total surplus working hour of bottleneck apparatuses to be allocated in the apparatus cluster, determining, according to the spare working hour, an adjustment rate of the bottleneck apparatus to be adjusted, and allocating, based on the adjustment rate and the total surplus working hour, working hours of producible product models of the product cluster to corresponding bottleneck apparatus to be allocated.

Optionally, in one or more examples of the disclosure, after the determining whether the apparatus load rates of the current bottleneck apparatuses exceeds a preset threshold, the method further includes:

arranging the current bottleneck apparatuses in sequence based on the apparatus load rates, under the condition that the apparatus load rates of the current bottleneck apparatuses are less than the preset threshold, to obtain an apparatus load rate sequence of the current bottleneck apparatuses;

obtaining a median load rate and a maximum load rate from the apparatus load rate sequence, determining a difference between the maximum load rate and the median load rate, and determining, under the condition that the difference exceeds a preset difference threshold, a current bottleneck apparatus corresponding to the maximum load rate as the bottleneck apparatus to be adjusted;

obtaining the apparatus cluster and the product cluster corresponding to the bottleneck apparatus to be adjusted, inputting, into a preset deep learning network, the difference, surplus working hours of bottleneck apparatuses to be allocated that correspond to product models of the product cluster and load rates of the corresponding bottleneck apparatuses to be allocated, and outputting working hours to be allocated that correspond to products of the bottleneck apparatus to be adjusted; and obtaining a total surplus working hour of the bottleneck apparatuses to be allocated in the product cluster, determining, based on the total surplus working hour and the surplus working hours, a working hour allocation rate of the bottleneck apparatuses to be allocated, and allocating, according to the working hour allocation rate, the working hours to be allocated.

Optionally, in one or more examples of the disclosure, the obtaining a current work-break mechanism of a target enterprise and apparatus load rates of current bottleneck apparatuses specifically includes:

obtaining influence data related to the apparatus load rates based on the preset database of the target enterprise; where the influence data includes: the current work-break mechanism, a quantity of the current bottleneck apparatuses, a planned production quantity, a unit product working hour and a planned working day;

determining a daily working hour of the target enterprise according to the current work-break mechanism, and determining available working hours of the current bottleneck apparatuses based on the quantity of the current bottleneck apparatuses, the planned working day and the daily working hour;

determining planned working hours of the current bottleneck apparatuses according to the planned production quantity and the unit product working hour; and determining the apparatus load rates of the current bottleneck apparatuses based on the available working hours and the planned working hours.

Optionally, in one or more examples of the disclosure, the obtaining a spare working hour of the bottleneck apparatus to be adjusted and a total surplus working hour of bottleneck apparatuses to be allocated in the apparatus cluster specifically includes:

determining the spare working hour of the bottleneck apparatus to be adjusted according to a difference between a planned working hour and an available working hour of the bottleneck apparatus to be adjusted; and determining, according to differences between planned working hours and available working hours of the bottleneck apparatuses to be allocated in the apparatus cluster, surplus working hours of each bottleneck apparatus to be allocated, and determining the total surplus working hour of the apparatus cluster based on the surplus working hours of each bottleneck apparatus to be allocated.

After the obtaining a spare working hour of the bottleneck apparatus to be adjusted and a total surplus working hour of bottleneck apparatuses to be allocated in the apparatus cluster, the method further includes:

obtaining, based on a preset database, production proportions of producible product models of the bottleneck apparatuses to be allocated; and determining, based on the production proportions and the total surplus working hour of the bottleneck apparatus to be allocated, surplus working hours corresponding to the producible product models of the bottleneck apparatuses to be allocated.

Optionally, in one or more examples of the disclosure, the determining, according to the spare working hour, an adjustment rate of the bottleneck apparatus to be adjusted specifically includes:

determining the producible product models of the bottleneck apparatus to be adjusted and the producible product models corresponding to the bottleneck apparatuses to be allocated, and determining a co-produced product model of the bottleneck apparatus to be adjusted and the bottleneck apparatus to be allocated;

obtaining planned working hours corresponding to co-produced product models of each bottleneck apparatus to be adjusted, and determining a total co-production working hour of the bottleneck apparatus to be adjusted; and determining, by inputting the spare working hour of the bottleneck apparatus to be adjusted and the total co-production working hour of the bottleneck apparatus to be adjusted into a preset adjustment rate formula, the adjustment rate of the bottleneck apparatus to be adjusted, where the preset adjustment rate formula is expressed as follows:

$$k = \frac{T_{spare}}{T_n} \times 100\%;$$

k denotes the adjustment rate of the bottleneck apparatus to be adjusted, $T_{spare}$ denotes the spare working hour, and $T_n$ denotes the total co-production working hour.

Optionally, in one or more examples of the disclosure, the allocating, based on the adjustment rate and the total surplus working hour, working hours of producible product models of the product cluster to corresponding bottleneck apparatus to be allocated specifically includes:

determining, based on the spare working hour of the bottleneck apparatus to be adjusted, product spare working hour of the producible product models of the bottleneck apparatus to be adjusted;

processing, based on a preset adjustment formula, the product spare working hour of the producible product model and the adjustment rate of the bottleneck apparatus to be adjusted, and determining working hours to be allocated of the producible product models of the bottleneck apparatus to be adjusted; where the preset adjustment formula is expressed as follows: $T_{adjust} = k \times T_{spare_i}$; $T_{adjust}$ denotes the working hours to be allocated, and $T_{spare_i}$ denotes the product spare working hour of the producible product model; and inputting the total surplus working hour of the bottleneck apparatuses to be allocated, the surplus working hours of each bottleneck apparatus to be allocated and the working hours to be allocated of the producible product models into a preset distribution formula, determining received working hours of the apparatuses to be allocated, and producing products of the producible product models based on the received working hours; where the preset distribution formula is expressed as follows:

$$T_{P_{ij}} = \frac{T_{P_j}}{\sum_j T_{P_j}} \times T_{adjust};$$

$T_{P_{ij}}$ denotes the received working hours of the apparatuses to be allocated, $\sum_j T_{P_j}$ denotes the total surplus working hour, and $T_{P_j}$ denotes the surplus working hours of the bottleneck apparatuses to be allocated.

Optionally, in one or more examples of the disclosure, after the determining, according to the spare working hour, an adjustment rate of the bottleneck apparatus to be adjusted, the method further includes:

determining whether the adjustment rate is great than a preset adjustment rate threshold; where the preset adjustment rate threshold is 100%; and determining that the adjustment rate equals the preset adjustment rate threshold under the condition that the adjustment rate exceeds the preset adjustment rate threshold.

Optionally, in one or more examples of the disclosure, after the allocating working hours of producible product models of the product cluster to corresponding bottleneck apparatus to be allocated, the method further includes:

implementing production scheduling optimization of the current bottleneck apparatuses in the target enterprise through iterative allocation of an apparatus of the current bottleneck apparatuses that has the highest apparatus load rate greater than the preset threshold;

determining optimized apparatus load rates corresponding to the current bottleneck apparatuses after the production scheduling optimization;

obtaining a current spare working hour of the current bottleneck apparatus under the condition that the apparatus load rate exceeds the preset threshold;

determining spare product quantities of producible product models of the current bottleneck apparatus based on the spare working hour and the unit product working hour; and obtaining upstream and downstream enterprises in a supply chain where the target enterprise is located, determining an assistant enterprise corresponding to the target enterprise based on associated enterprises of the upstream and downstream enterprises, and producing products of the spare product quantity based on the assistant enterprise.

One or more examples of the disclosure provide a device for optimizing production scheduling based on a capacity of a bottleneck apparatus. The device includes:

a processor, and a memory configured to store a computer-executable instruction, where the computer-executable instruction causes the processor to execute operations as follows:

obtaining a current work-break mechanism of a target enterprise and apparatus load rates of current bottleneck apparatuses, and determining whether the apparatus load rates of the current bottleneck apparatuses exceeds a preset threshold under the condition that the current work-break mechanism is an extreme work-break mechanism; where the extreme work-break mechanism is a work-break mechanism combining a three-shift mode with a natural-day working mode;

if the apparatus load rates of the current bottleneck apparatuses exceeds the preset threshold, determining an apparatus that has a highest apparatus load rate as a bottleneck apparatus to be adjusted, and obtaining, according to a production schedule of the target enterprise, a plurality of producible product models corresponding to the bottleneck apparatus to be adjusted and a plurality of bottleneck apparatus to be allocated that correspond to the same model product as the bottleneck apparatus to be adjusted; where an apparatus load rate of the bottleneck apparatus to be allocated is less than or equal to the preset threshold;

determining, based on the plurality of bottleneck apparatuses to be allocated, an apparatus cluster corresponding to the bottleneck apparatus to be adjusted, and determining, according to products co-produced by the bottleneck apparatus to be adjusted and the plurality of the bottleneck apparatuses to be allocated, a product cluster corresponding to the bottleneck apparatus to be adjusted; and obtaining a spare working hour of the bottleneck apparatus to be adjusted and a total surplus working hour of bottleneck apparatuses to be allocated in the apparatus cluster, determining, according to the spare working hour, an adjustment rate of the bottleneck apparatus to be adjusted, and allocating, based on the adjustment rate and the total surplus working hour, working hours of producible product models of the product cluster to corresponding bottleneck apparatus to be allocated.

One or more examples of the disclosure provide a non-volatile computer storage medium. The non-volatile computer storage medium stores a computer-executable instruction, where the computer-executable instruction is configured to:

obtain a current work-break mechanism of a target enterprise and apparatus load rates of current bottleneck apparatuses, and determine whether the apparatus load rates of the current bottleneck apparatuses exceeds a preset threshold under the condition that the current work-break mechanism is an extreme work-break mechanism; where the extreme work-break mechanism is a work-break mechanism combining a three-shift mode with a natural-day working mode;

if the apparatus load rates of the current bottleneck apparatuses exceeds the preset threshold, determine an apparatus that has a highest apparatus load rate as a bottleneck apparatus to be adjusted, and obtain, according to a production schedule of the target enterprise, a plurality of producible product models corresponding to the bottleneck apparatus to be adjusted and a plurality of bottleneck apparatus to be allocated that correspond to the same model product as the bottleneck apparatus to be adjusted; where an apparatus load rate of the bottleneck apparatus to be allocated is less than or equal to the preset threshold;

determine, based on the plurality of bottleneck apparatuses to be allocated, an apparatus cluster corresponding to the bottleneck apparatus to be adjusted, and determine, according to products co-produced by the bottleneck apparatus to be adjusted and the plurality of the bottleneck apparatuses to be allocated, a product cluster corresponding to the bottleneck apparatus to be adjusted; and obtain a spare working hour of the bottleneck apparatus to be adjusted and a total surplus working hour of bottleneck apparatuses to be allocated in the apparatus cluster, determine, according to the spare working hour, an adjustment rate of the bottleneck apparatus to be adjusted, and allocate, based on the adjustment rate and the total surplus working hour, working hours of producible product models of the product cluster to corresponding bottleneck apparatus to be allocated.

At least one technical solution adopted by the example of the disclosure can achieve the following beneficial effects:

By obtaining the apparatus load rates of the current bottleneck apparatuses, the apparatus that has the highest apparatus load rate greater than the preset threshold is determined as the bottleneck apparatus to be adjusted. Thus, the spare working hour of the bottleneck apparatus to be adjusted is allocated to the plurality of bottleneck apparatus to be allocated that correspond to the same model product in turn, the load rates of the bottleneck apparatuses are balanced through peak-load shifting, and the apparatus capacity of the bottleneck apparatus to be allocated that perform co-production with the bottleneck apparatus to be adjusted is fully utilized. By balancing the load rates of the bottleneck apparatuses, capacities of the bottleneck apparatuses come into play to the maximum extent. In addition, the load rate of the bottleneck apparatus to be adjusted is reduced to within a range of the threshold of the load rate to a certain extent, and subcontracting and outsourcing are reduced for the enterprise.

BRIEF DESCRIPTION OF THE DRAWINGS

To describe technical solutions in examples of the disclosure or in the prior art more clearly, accompanying drawings required in description of the examples or in the prior art will be described briefly below. Apparently, the accompanying drawings in the following description merely show some examples described in the disclosure, and a person of ordinary skill in the art can still derive other accompanying drawings from these accompanying drawings without creative efforts. In the figures:

FIG. 1 is a schematic flowchart of a method for optimizing production scheduling based on a capacity of a bottleneck apparatus according to an example of the disclosure;

DETAILED DESCRIPTION OF THE EMBODIMENTS

Figure 2:
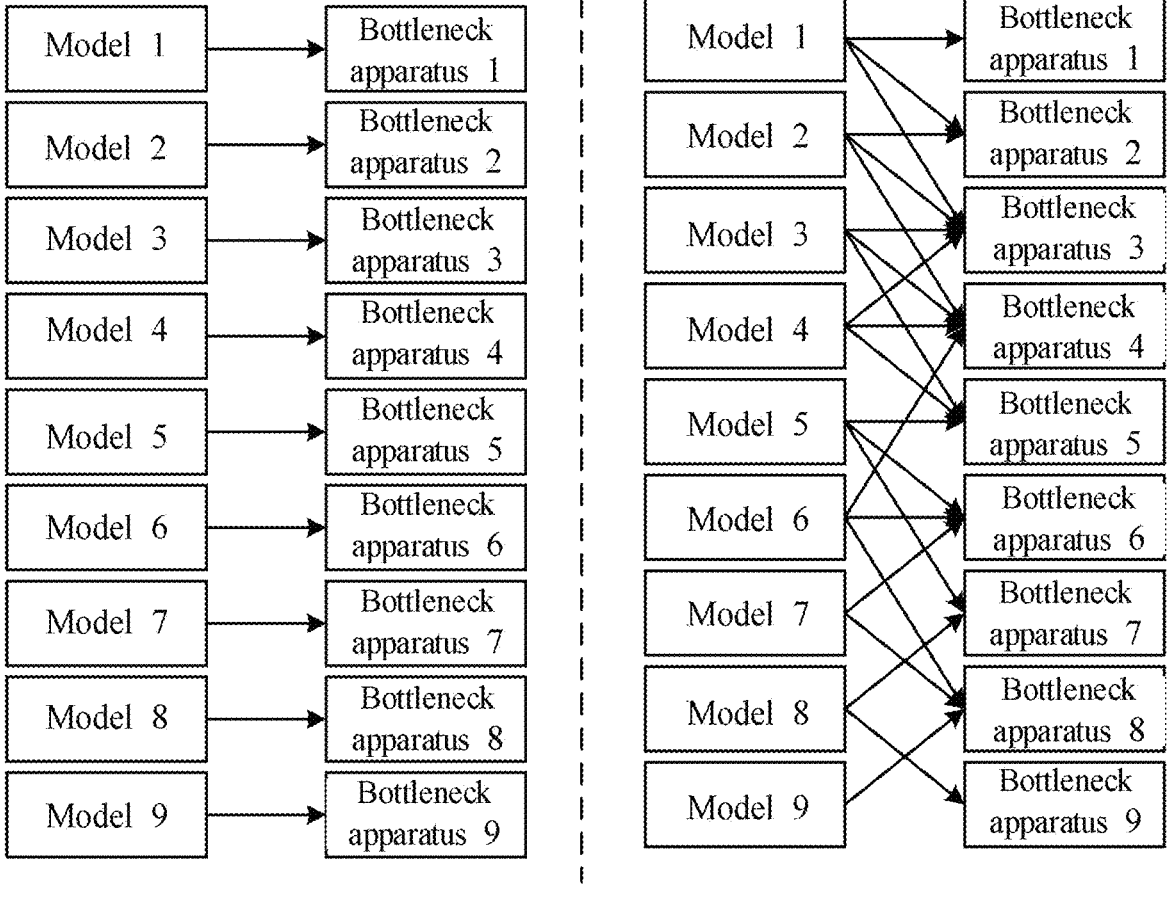
FIG. 2 is a schematic diagram of co-production of bottleneck apparatuses in different production modes in an application scenario according to an example of the disclosure.

Examples of the disclosure provide a method and device for optimizing production scheduling based on a capacity of a bottleneck apparatus, and a medium.

In order to make those skilled in the art better understand technical solutions of the disclosure, the technical solutions in the examples of the disclosure will be described clearly and comprehensively below in conjunction with accompanying drawings of the examples of the disclosure. Apparently, the examples described are merely some examples rather than all examples of the disclosure. Based on the examples of the disclosure, all other examples derived by those of ordinary skill in the art without making creative efforts should fall within the protection scope of the disclosure. FIG. 1 shows a schematic flowchart of a method for optimizing production scheduling based on a capacity of a bottleneck apparatus according to an example of the disclosure. As shown in FIG. 1, the method for optimizing production scheduling based on a capacity of a bottleneck apparatus includes:

S101, a current work-break mechanism of a target enterprise and apparatus load rates of current bottleneck apparatuses are obtained, and whether the apparatus load rates of the current bottleneck apparatuses exceeds a preset threshold is determined under the condition that the current work-break mechanism is an extreme work-break mechanism; where the extreme work-break mechanism is a work-break mechanism combining a three-shift mode with a natural-day working mode.

At first, in order to balance the load rates of the bottleneck apparatuses and give play to the capacities of the bottleneck apparatuses to the maximum extent, the current work-break mechanism of the target enterprise and the apparatus load rates of the current bottleneck apparatuses are obtained at first in the example of the disclosure. Under the condition that it is determined that the current work-break mechanism corresponding to the current bottleneck apparatus is the extreme work-break mechanism, that is, the work-break mechanism combining the three-shift mode with the natural-day working mode, the current bottleneck apparatus may be operated within 24 hours. In this case, whether the apparatus load rates of the current bottleneck apparatuses exceeds the preset threshold is determined. It can be understood that under the condition that the apparatus load rates of the current bottleneck apparatuses exceeds the preset threshold, it means that the current bottleneck apparatus is overloaded and cannot satisfy a production demand for products. Thus, it is necessary to analyze the current bottleneck apparatus in an overloaded state for production scheduling optimization.

Further, in one or more examples of the disclosure, the step that a current work-break mechanism of a target enterprise and apparatus load rates of current bottleneck apparatuses are obtained specifically includes: influence data related to the apparatus load rates are obtained based on a preset database of the target enterprise at first. It should be noted that the preset database stores basic data related to the bottleneck apparatus and products, work-break mechanism data of the current target enterprise and production capacity data related to the bottleneck apparatus. The influence data related to the apparatus load rates are extracted based on the above data and include: the current work-break mechanism, a quantity of the current bottleneck apparatuses, a planned production quantity, a unit product working hour, a planned working day, etc. According to the current work-break mechanism, the daily working hour of the target enterprise is determined. For example, if the current work-break mechanism is a work-break mechanism combining a single-shift mode with a working day mode, the daily working hours of the target enterprise in this case are 8 hours. Available working hours of the current bottleneck apparatuses may be determined based on the quantity of the current bottleneck apparatuses, the planned working day and the daily working hour. Then, the planned working hours of the current bottleneck apparatuses may be determined according to a product of the planned production quantity and the unit product working hour. The apparatus load rates of the current bottleneck apparatuses are determined based on the computed available working hours and planned working hours. Thus, whether the current bottleneck apparatus is in an overload state is determined based on the apparatus load rate and the capacity of the bottleneck apparatus is evaluated.

S102, if the apparatus load rates of the current bottleneck apparatuses exceeds the preset threshold, an apparatus that has a highest apparatus load rate is determined as a bottleneck apparatus to be adjusted, and according to a production schedule of the target enterprise, a plurality of producible product models corresponding to the bottleneck apparatus to be adjusted and a plurality of bottleneck apparatus to be allocated that correspond to the same model product as the bottleneck apparatus to be adjusted are obtained; where an apparatus load rate of the bottleneck apparatus to be allocated is less than or equal to the preset threshold.

In S101, whether the apparatus load rates of the current bottleneck apparatuses exceeds a preset threshold is determined, after that, if it is determined that the apparatus load rates of the current bottleneck apparatuses exceeds the preset threshold in an example of the disclosure, it means that the current bottleneck apparatus that has the load rate greater than the preset threshold needs to be adjusted. In order to achieve an effect of balancing the bottleneck apparatus load rate through peak-load shifting, the apparatus that has the highest apparatus load rate is determined as the bottleneck apparatus to be adjusted at first, such that the apparatus that has the highest apparatus load rate can be adjusted at first, and then an adjustment process is repeated to completely adjust the bottleneck apparatuses that exceed the preset threshold. After the bottleneck apparatus to be adjusted is obtained, as shown in FIG. 2, since the current enterprise is generally in a parallel production mode, the bottleneck apparatuses are not in one-to-one correspondence to the product models of production, but co-produce the product modes. The bottleneck apparatus may produce products of various product models, and the products of the models may also be produced by a plurality of bottleneck apparatuses. Thus, according to the production schedule of the target enterprise, the plurality of producible product models corresponding to the bottleneck apparatus to be adjusted and the plurality of bottleneck apparatus to be allocated that correspond to the same model product as the bottleneck apparatus to be adjusted are obtained. That is, as shown in FIG. 2, an apparatus that perform co-production with the bottleneck apparatus to be adjusted is determined as the bottleneck apparatus to be allocated. It can be understood that in order to balance the load rates of the bottleneck apparatuses, when the bottleneck apparatus to be adjusted that has a high load rate is adjusted, the bottleneck apparatus to be allocated is an apparatus whose apparatus load rate is less than or equal to the preset threshold.

S103, based on the plurality of bottleneck apparatuses to be allocated, an apparatus cluster corresponding to the bottleneck apparatus to be adjusted is determined, and according to products co-produced by the bottleneck apparatus to be adjusted and the plurality of the bottleneck apparatuses to be allocated, a product cluster corresponding to the bottleneck apparatus to be adjusted is determined.

In order to ensure that products of the producible product models of the bottleneck apparatus to be adjusted are adjusted to corresponding bottleneck apparatuses to be allocated for being produced, so as to balance the load rates of the bottleneck apparatuses and reduce the load rate of the bottleneck apparatus to be adjusted, the apparatus cluster corresponding to the bottleneck apparatus to be adjusted is determined according to the plurality of bottleneck apparatus to be allocated in this example of the disclosure. That is, n bottleneck apparatuses to be allocated that have load rates not greater than the threshold and perform co-production with the bottleneck apparatus to be adjusted that has the load rate greater than the threshold are determined as the apparatus cluster $E_n$. In addition, according to the products co-produced by the bottleneck apparatus to be adjusted and the plurality of the bottleneck apparatuses to be allocated, the product cluster corresponding to the bottleneck apparatus to be adjusted is determined. That is to say, m product models co-produced not only by the bottleneck apparatus that has the load rate greater than the threshold are recorded as the product model cluster $P_m$. It should be noted that the co-produced products as shown in FIG. 2 is products that can be produced by the bottleneck apparatus to be adjusted and can also be produced by the bottleneck apparatus to be allocated in parallel mode.

S104, a spare working hour (or shortage working hour) of the bottleneck apparatus to be adjusted and a total surplus working hour of bottleneck apparatuses to be allocated in the apparatus cluster are obtained, an adjustment rate of the bottleneck apparatus to be adjusted is determined according to the spare working hour, and based on the adjustment rate and the total surplus working hour, working hours of producible product models of the product cluster are allocated to corresponding bottleneck apparatuses to be allocated.

To determine the spare working hour of the bottleneck apparatus to be adjusted and the surplus working hour of the bottleneck apparatus to be allocated, such that the spare working hour of the bottleneck apparatus to be adjusted is allocated to the bottleneck apparatus to be allocated, and the capacity of the bottleneck apparatus is fully utilized. In the example of the disclosure, at first, the spare working hour of the bottleneck apparatus to be adjusted and the total surplus working hour of bottleneck apparatuses to be allocated in the apparatus cluster are obtained. Then, according to the spare working hour, the adjustment rate of the bottleneck apparatus to be adjusted is determined. Based on the adjustment rate and the total surplus working hour, the working hours of producible product models of the product cluster are allocated to corresponding bottleneck apparatuses to be allocated. Thus, production scheduling optimization is implemented.

Specifically, the step that a spare working hour of the bottleneck apparatus to be adjusted and a total surplus working hour of bottleneck apparatuses to be allocated in the apparatus cluster are obtained specifically includes:

spare working hour of the bottleneck apparatus to be adjusted is determined based on a difference between the planned working hour and the available working hour of the bottleneck apparatus to be adjusted that are obtained in S101. The spare working hour is expressed as follows: $T_{spare}=|T_{requirement}-T_{available}|$, where $T_{requirement}$ denotes the planned working hour, $T_{available}$ denotes the available working hour, and $T_{spare}$ denotes the spare working hour. Then, according to differences between planned working hours and available working hours of the bottleneck apparatuses to be allocated in the apparatus cluster, surplus working hours of the bottleneck apparatuses to be allocated are determined. Then, the total surplus working hour of the apparatus cluster is determined based on the surplus working hours of the bottleneck apparatuses to be allocated. It should be noted that after the step that a spare working hour of the bottleneck apparatus to be adjusted and a total surplus working hour of bottleneck apparatuses to be allocated in the apparatus cluster are obtained, the method further includes: based on a preset database in the step above, production proportions of producible product models of the bottleneck apparatuses to be allocated are obtained. Then, based on the production proportions and the total surplus working hour of the bottleneck apparatus to be allocated, surplus working hours corresponding to the producible product models of the bottleneck apparatuses to be allocated are determined.

Further, the step that an adjustment rate of the bottleneck apparatus to be adjusted is determined according to the spare working hour specifically includes: at first, the producible product models of the bottleneck apparatus to be adjusted and the producible product models corresponding to the bottleneck apparatuses to be allocated are determined, and a co-produced product model of the bottleneck apparatus to be adjusted and the bottleneck apparatus to be allocated is determined. Planned working hours corresponding to co-produced product models of the bottleneck apparatus to be adjusted are obtained, and a total co-production working hour $T_n$ of the bottleneck apparatus to be adjusted is determined. The spare working hour of the bottleneck apparatus to be adjusted and the total co-production working hour of the bottleneck apparatus to be adjusted are input into a preset adjustment rate formula, and the adjustment rate of the bottleneck apparatus to be adjusted is determined. The preset adjustment rate formula is expressed as follows:

$$k = \frac{T_{spare}}{T_n} \times 100\%,$$

where k denotes the adjustment rate of the bottleneck apparatus to be adjusted.

Further, in one or more examples of the disclosure, the step that based on the adjustment rate and the total surplus working hour, working hours of producible product models of the product cluster are allocated to corresponding bottleneck apparatuses to be allocated specifically includes:

At first, based on the spare working hour of the bottleneck apparatus to be adjusted, product spare working hour of the producible product models of the bottleneck apparatus to be adjusted are determined. Based on a preset adjustment formula, the product spare working hour of the producible product model and the adjustment rate of the bottleneck apparatus to be adjusted are processed, and working hours to be allocated of the producible product models of the bottleneck apparatus to be adjusted are determined. The preset adjustment formula is expressed as follows: $T_{adjust}=k \times T_{spare_i}$; $T_{adjust}$ denotes the working hours to be allocated, and $T_{spare_i}$ denotes the product spare working hour of the producible product models, that is, the working hour $T_{adjust}=k \times T_{spare_i}$ of the bottleneck apparatus to be adjusted that has the load rate higher than the threshold, to be adjusted to j bottleneck apparatuses to be allocated that perform co-production. Then, according to the total surplus working hour of the bottleneck apparatuses to be allocated and the surplus working hours of each bottleneck apparatus to be allocated, a received working hour proportion of each apparatus to be allocated is determined as ing hour proportion and the working hours to be allocated of the producible product models, allocation $$T_{P_{ij}} = \frac{T_{P_j}}{\sum_j T_{P_j}} \times T_{adjust}$$

of the working hours of $T_{adjust}$ to j co-production apparatuses is computed. The preset distribution formula is expressed as $$T_{P_{ij}} = \frac{T_{P_j}}{\sum_j T_{P_j}} \times T_{adjust},$$

and the total surplus working hour of the bottleneck apparatuses to be allocated, the surplus working hours of each bottleneck apparatus to be allocated and the working hours to be allocated of the producible product models are input into the preset distribution formula, such that received working hours of each apparatus to be allocated may be determined, and products of the producible product model are produced based on the received working hours.

In order to explain the production scheduling optimization process more vividly, a data table of a case that the total surplus working hour of the apparatuses to be allocated is greater than the spare working hour is shown in the following table 1.

TABLE 1

| | Producible product model 1 | Producible product model 2 | Producible product model 3 | Producible product model 4 | Producible product model 5 | Surplus working hour |
|---|---|---|---|---|---|---|
| Bottleneck apparatus 1 | 200 | 200 | 100 | 100 | 200 | −400 |
| Bottleneck apparatus 2 | 500 | 400 | 100 | 200 | 500 | 500 |
| Bottleneck apparatus 3 | 400 | 400 | 100 | 300 | 400 | 400 |
| Bottleneck apparatus 4 | 500 | 500 | 100 | 200 | 500 | 600 |
| Bottleneck apparatus 5 | 400 | 500 | 100 | 200 | 500 | 500 |

Data table of a case that the total surplus working hour of the apparatuses to be allocated is greater than the spare working hour $$\frac{T_{P_j}}{\sum_j T_{P_j}};$$

where $\sum_j T_{P_j}$ denotes the surplus working hour, and $T_{P_j}$ denotes the surplus working hours of each bottleneck apparatus to be allocated. Based on the received working hour proportion and the working hours to be allocated of the producible product models, the received working hours of each apparatus to be allocated are determined, such that products of the producible product models are produced according to the received working hours. That is, at first, a total surplus working hour $T_{P_i}=\sum_j T_{P_j}$ of j apparatuses in the apparatus cluster $E_n$ related to an $i^{th}$ product in the product model cluster $P_m$ is computed. Based on the received work- As shown in Table 1 above, it can be seen from the surplus working hour of the bottleneck apparatus 1 of −400 that the bottleneck apparatus 1 currently has a spare working hour. Compared with other bottleneck apparatuses, it can be seen that the bottleneck apparatus 1 has an insufficient capacity and needs to be adjusted as the bottleneck apparatus to be adjusted. In addition, it can be seen from Table 1 that co-produced product models among the bottleneck apparatus 1, the bottleneck apparatus 2, the bottleneck apparatus 3, the bottleneck apparatus 4 and the bottleneck apparatus 5 include the producible product model 1, the producible product model 2, the producible product model 3, the producible product model 4 and the producible product model 5. At this time, the total co-production working hour of the bottleneck apparatus 1 that may be adjusted to other average devices is as follows: 200+200+100+100+200=800, and the adjustment rate of the bottleneck apparatus 1 is 400/800=50%. The total surplus working hour of the bottleneck apparatus 2, the bottleneck apparatus 3, the bottleneck apparatus 4 and the bottleneck apparatus 5 is as follows:

threshold. For more vivid explanation, a data table of a case that the total surplus working hour of the apparatuses to be allocated is smaller than the spare working hour is shown in the following table 2.

TABLE 2

| Data table of a case that the total surplus working hour of the apparatuses to be allocated is smaller than the spare working hour | | | | | |
| --- | --- | --- | --- | --- | --- |
| | Producible product model 1 | Producible product model 2 | Producible product model 3 | Producible product model 4 | Producible product model 5 | Surplus working hour |
| Bottleneck apparatus 1 | 200 | 200 | 100 | 100 | 200 | −400 |
| Bottleneck apparatus 2 | 500 | 200 | 100 | 200 | 250 | 50 |
| Bottleneck apparatus 3 | 400 | 400 | 100 | 140 | 200 | 40 |
| Bottleneck apparatus 4 | 200 | 500 | 100 | 200 | 260 | 60 |
| Bottleneck apparatus 5 | 500 | 200 | 100 | 250 | 200 | 50 |

500+400+600+500=2000. With production scheduling on products of the producible product model 3 in the bottleneck apparatus 1 as an example, the total working hour required to produce the products of the producible product model 3 is as follows: 100+100+100+100+100=500. In order to reduce the load rate of the bottleneck apparatus 1, it is necessary to adjust the working hour of the bottleneck apparatus 1 by 50%, that is, 100×50%=50. In this case, a received working hour of the bottleneck apparatus 2 is as follows:

$$\frac{500}{2000} \times 50 = 12.5,$$

a received working hour of the bottleneck apparatus 3 is as follows:

$$\frac{400}{2000} \times 50 = 10,$$

a received working hour of the bottleneck apparatus 4 is $$\frac{600}{2000} \times 50 = 15,$$

and a received working hour of the bottleneck apparatus 5 is $$\frac{500}{2000} \times 50 = 12.5.$$

Further, in one or more examples of the disclosure, after the step that according to the spare working hour, an adjustment rate of the bottleneck apparatus to be adjusted is determined, the method further includes: whether the adjustment rate is great than a preset adjustment rate threshold is determined at first; where the preset adjustment rate threshold is 100%. It is determined that the adjustment rate equals the preset adjustment rate threshold under the condition that the adjustment rate exceeds the preset adjustment rate As shown in FIG. 2, still with the production scheduling optimization process of the producible product model 3 as an example, the total surplus working hour of the bottleneck apparatus 2, the bottleneck apparatus 3, the bottleneck apparatus 4 and the bottleneck apparatus 5 is 50+40+60+50-200, 200<400, and 400/200>100%, and the adjustment rate in this case is 100%. That is, the surplus working hours of the bottleneck apparatus 2, the bottleneck apparatus 3, the bottleneck apparatus 4 and the bottleneck apparatus 5 cannot satisfy the spare working hour of the bottleneck apparatus 1, and the surplus working hours need to be overall allocated in this case. In this case, a received working hour of the bottleneck apparatus 2 is as follows:

$$\frac{50}{200} \times 200 = 50,$$

a received working hour of the bottleneck apparatus 3 is as follows:

$$\frac{40}{200} \times 200 = 40,$$

a received working hour of the bottleneck apparatus 4 is $$\frac{60}{200} \times 200 = 60,$$

and a received working hour of the bottleneck apparatus 5 is $$\frac{50}{200} \times 200 = 50.$$

Further, in one or more examples of the disclosure, when the capacity of bottleneck apparatuses may be satisfied, that is, the apparatus load rate does not exceed a range of the threshold, the load rates of bottleneck apparatuses need to be balanced if the load rates of several bottleneck apparatuses are significantly higher than load rates of other bottleneck apparatuses. In the example of the disclosure in this case, after the step that whether the apparatus load rates of the current bottleneck apparatuses exceeds a preset threshold is determined, the method further includes:

The current bottleneck apparatuses are arranged in sequence based on the apparatus load rates under the condition that the apparatus load rates of the current bottleneck apparatuses are less than the preset threshold, and an apparatus load rate sequence of the current bottleneck apparatuses are obtained.

In order to determine whether the load rates of the bottleneck apparatuses in this case are obviously unbalanced, a median load rate and a maximum load rate are obtained from the apparatus load rate sequence, a difference between the maximum load rate and the median load rate is determined, and under the condition that it is determined that the difference exceeds a preset difference threshold, a current bottleneck apparatus corresponding to the maximum load rate is determined as the bottleneck apparatus to be adjusted. The apparatus cluster and the product cluster corresponding to the bottleneck apparatus to be adjusted are obtained, the difference, surplus working hours of bottleneck apparatuses to be allocated that correspond to product models of the product cluster and load rates of the corresponding bottleneck apparatuses to be allocated are input into a preset deep learning network for being predicted, and then working hours to be allocated that correspond to products in the bottleneck apparatus to be adjusted are output. In this case, a total surplus working hour of the bottleneck apparatuses to be allocated in the product cluster is obtained, a working hour allocation rate of the bottleneck apparatuses to be allocated is determined based on the total surplus working hour and the surplus working hours, and the working hours to be allocated are allocated according to the working hour allocation rate. It should be noted that before the step that the difference, surplus working hours of bottleneck apparatuses to be allocated that correspond to product models of the product cluster and load rates of the corresponding bottleneck apparatuses to be allocated are input into a preset deep learning network for being predicted, the method further includes: historical adjustment data of the target enterprise are obtained based on a preset database of the target enterprise, where the historical adjustment data include: the difference of the load rates of the bottleneck apparatuses before adjustment, the surplus working hours of the bottleneck apparatus to be allocated, the load rate of the bottleneck apparatus to be allocated and other related adjustment data. Based on the historical adjustment data, complete adjustment data corresponding to an adjustment process of the bottleneck apparatuses are determined, the complete adjustment data of the bottleneck apparatuses are input into an initial deep learning network model as training samples for iterative training, and a trained deep learning network model is determined as the preset deep learning network model.

Further, in order to solve the problem that the capacity of the bottleneck apparatus in the target enterprise still cannot guarantee production after the production scheduling optimization. In one or more examples of the disclosure, after the step that working hours of producible product models of the product cluster are allocated to corresponding bottleneck apparatus to be allocated, the method further includes:

Production scheduling optimization of the current bottleneck apparatuses in the target enterprise is implemented through iterative allocation of an apparatus of the current bottleneck apparatuses that has the highest apparatus load rate greater than the preset threshold. Optimized apparatus load rates corresponding to the current bottleneck apparatus are determined after production scheduling optimization. If the apparatus load rate is less than the preset threshold, it means that the capacity of the bottleneck apparatus capacity can be satisfied in this case. After production scheduling optimization, a master production schedule (MPS) solution after production scheduling optimization is adopted to balance the load rate. However, if the apparatus load rate exceeds the preset threshold, it means that the apparatus capacity still cannot be satisfied after production scheduling optimization. In this case, subcontracting or outsourcing are necessary for production, and it is necessary to obtain the current spare working hour of the current bottleneck apparatus. Spare product quantities of producible product models of the current bottleneck apparatus are determined based on the spare working hour and the unit product working hour. Then, for determining a corresponding subcontracting or outsourcing enterprise, upstream and downstream enterprises in a supply chain where the target enterprise is located are obtained, an assistant enterprise corresponding to the target enterprise is determined based on associated enterprises of the upstream and downstream enterprises, and products of the spare product quantity are produced under assistance based on the assistant enterprise.

Figures 3, 4:
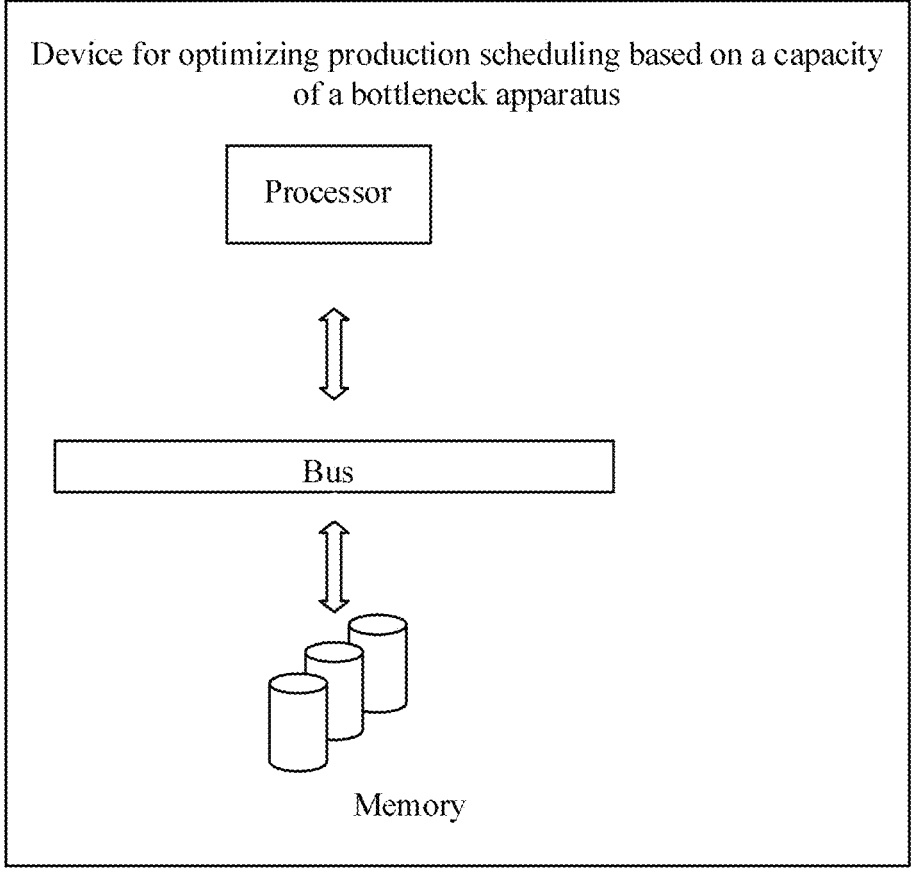
FIG. 3 is a schematic diagram of an internal structure of a device for optimizing production scheduling based on a capacity of a bottleneck apparatus according to an example of the disclosure.
FIG. 4 is a schematic diagram of an internal structure of a non-volatile storage medium according to an example of the disclosure.

FIG. 3 shows a schematic diagram of an internal structure of a device for optimizing production scheduling based on a capacity of a bottleneck apparatus according to one or more examples of the disclosure. As shown in FIG. 3, the device for optimizing production scheduling based on a capacity of a bottleneck apparatus includes:

a processor, and a memory configured to store a computer-executable instruction, where the computer-executable instruction causes the processor to execute operations as follows:

a current work-break mechanism of a target enterprise and apparatus load rates of current bottleneck apparatuses are obtained, and whether the apparatus load rates of the current bottleneck apparatuses exceeds a preset threshold is determined under the condition that the current work-break mechanism is an extreme work-break mechanism; where the extreme work-break mechanism is a work-break mechanism combining a three-shift mode with a natural-day working mode;

if the apparatus load rates of the current bottleneck apparatuses exceeds the preset threshold, an apparatus that has a highest apparatus load rate is determined as a bottleneck apparatus to be adjusted, and a plurality of producible product models corresponding to the bottleneck apparatus to be adjusted and a plurality of bottleneck apparatus to be allocated that correspond to the same model product as the bottleneck apparatus to be adjusted are obtained according to a production schedule of the target enterprise; where an apparatus load rate of the bottleneck apparatus to be allocated is less than or equal to the preset threshold;

an apparatus cluster corresponding to the bottleneck apparatus to be adjusted is determined based on the plurality of bottleneck apparatuses to be allocated, and a product cluster corresponding to the bottleneck apparatus to be adjusted is determined according to products co-produced by the bottleneck apparatus to be adjusted and the plurality of the bottleneck apparatuses to be allocated; and a spare working hour of the bottleneck apparatus to be adjusted and a total surplus working hour of bottleneck apparatuses to be allocated in the apparatus cluster are obtained, an adjustment rate of the bottleneck apparatus to be adjusted is determined according to the spare working hour, and working hours of producible product models of the product cluster are allocated to corresponding bottleneck apparatus to be allocated based on the adjustment rate and the total surplus working hour.

FIG. 4 shows a schematic diagram of an internal structure of a non-volatile storage medium according to one or more examples of the disclosure. As shown in FIG. 4, the non-volatile storage medium stores a computer-executable instruction, where the computer-executable instruction may execute operations as follows:

a current work-break mechanism of a target enterprise and apparatus load rates of current bottleneck apparatuses are obtained, and whether the apparatus load rates of the current bottleneck apparatuses exceeds a preset threshold is determined under the condition that the current work-break mechanism is an extreme work-break mechanism; where the extreme work-break mechanism is a work-break mechanism combining a three-shift mode with a natural-day working mode;

if the apparatus load rates of the current bottleneck apparatuses exceeds the preset threshold, an apparatus that has a highest apparatus load rate is determined as a bottleneck apparatus to be adjusted, and a plurality of producible product models corresponding to the bottleneck apparatus to be adjusted and a plurality of bottleneck apparatus to be allocated that correspond to the same model product as the bottleneck apparatus to be adjusted are obtained according to a production schedule of the target enterprise; where an apparatus load rate of the bottleneck apparatus to be allocated is less than or equal to the preset threshold;

an apparatus cluster corresponding to the bottleneck apparatus to be adjusted is determined based on the plurality of bottleneck apparatuses to be allocated, and a product cluster corresponding to the bottleneck apparatus to be adjusted is determined according to products co-produced by the bottleneck apparatus to be adjusted and the plurality of the bottleneck apparatuses to be allocated; and a spare working hour of the bottleneck apparatus to be adjusted and a total surplus working hour of bottleneck apparatuses to be allocated in the apparatus cluster are obtained, an adjustment rate of the bottleneck apparatus to be adjusted is determined according to the spare working hour, and working hours of producible product models of the product cluster are allocated to corresponding bottleneck apparatus to be allocated based on the adjustment rate and the total surplus working hour.

The examples in the disclosure are described in a progressive manner, mutual reference can be made to the same or similar parts of the examples, and each example focuses on description of differences from the other examples. In particular, the examples of the apparatus, the device and a non-volatile computer storage medium are basically similar to the method example, and are described relatively simply as a result, and reference can be made to description of the method example for relevant contents.

Finally, it should be understood that the above examples are merely used to illustrate the technical solution of the disclosure rather than to limit same. Although the disclosure has been described in detail with reference to the foregoing examples, it should be understood by a person of ordinary skill in the art that the technical solutions described in the foregoing examples can be still modified, or partial technical features therein can be replaced equivalently; and such modifications or replacements do not deviate the nature of the corresponding technical solution from the spirit and scope of the technical solutions of the examples of the disclosure.

What is claimed is:

1. A computer-implemented method for real-time optimizing production scheduling based on a capacity of a bottleneck apparatus executed by a processor using a production control system of a manufacturing enterprise comprising:

obtaining, by accessing a production scheduling database stored in a memory and executing a scheduling optimization program on the processor, a current work-break mechanism of a target enterprise and apparatus load rates of current bottleneck apparatuses, and determining whether the apparatus load rates of the current bottleneck apparatuses exceed a preset threshold under a condition that the current work-break mechanism is an extreme work-break mechanism; wherein the extreme work-break mechanism is a work-break mechanism combining a three-shift mode with a natural-day working mode;

when the apparatus load rates of the current bottleneck apparatuses exceed the preset threshold, determining, by accessing the production scheduling database stored in the memory and executing the scheduling optimization program on the processor, an apparatus that has a highest apparatus load rate as a bottleneck apparatus to be adjusted, and obtaining, according to a production schedule of the target enterprise, a plurality of producible product models corresponding to the bottleneck apparatus to be adjusted and a plurality of bottleneck apparatuses to be allocated that correspond to an equal model product as the bottleneck apparatus to be adjusted; wherein an apparatus load rate of the bottleneck apparatus to be allocated is less than or equal to the preset threshold;

determining, by accessing the production scheduling database stored in the memory and executing the scheduling optimization program on the processor, based on the plurality of bottleneck apparatuses to be allocated, an apparatus cluster corresponding to the bottleneck apparatus to be adjusted, wherein each bottleneck apparatus of the current bottleneck apparatuses produces one or more product models, wherein each bottleneck apparatus of the plurality of bottleneck apparatuses to be allocated is determined based on whether the bottleneck apparatus produces at least one product model which is the same as at least one product model produced by the bottleneck apparatus to be adjusted, and determining, according to products co-produced and in parallel by the bottleneck apparatus to be adjusted and the plurality of bottleneck apparatuses to be allocated, a product cluster corresponding to the bottleneck apparatus to be adjusted; and obtaining, by accessing the production scheduling database stored in the memory and executing the scheduling optimization program on the processor, a spare working hour of the bottleneck apparatus to be adjusted and a total surplus working hour of the bottleneck apparatuses to be allocated in the apparatus cluster, determining, according to the spare working hour, an adjustment rate of the bottleneck apparatus to be adjusted, and allocating, based on the adjustment rate and the total surplus working hour, working hours of producible product models of the product cluster to corresponding bottleneck apparatuses to be allocated;

wherein a step of obtaining the spare working hour of the bottleneck apparatus to be adjusted and the total surplus working hour of the bottleneck apparatuses to be allocated in the apparatus cluster comprises:

determining, by accessing the production scheduling database stored in the memory and executing the scheduling optimization program on the processor, the spare working hour of the bottleneck apparatus to be adjusted according to a difference between a planned working hour and an available working hour of the bottleneck apparatus to be adjusted; and determining, by accessing the production scheduling database stored in the memory and executing the scheduling optimization program on the processor, according to differences between planned working hours and available working hours of the bottleneck apparatuses to be allocated in the apparatus cluster, surplus working hours of the bottleneck apparatuses to be allocated, and determining the total surplus working hour of the apparatus cluster based on the surplus working hours of the bottleneck apparatuses to be allocated;

wherein after the step of obtaining the spare working hour of the bottleneck apparatus to be adjusted and the total surplus working hour of the bottleneck apparatuses to be allocated in the apparatus cluster, the method further comprises:

obtaining, by accessing the production scheduling database stored in the memory and executing the scheduling optimization program on the processor, based on a preset database, production proportions of producible product models of the bottleneck apparatuses to be allocated; and determining, by accessing the production scheduling database stored in the memory and executing the scheduling optimization program on the processor, based on the production proportions and the total surplus working hour of the bottleneck apparatus to be allocated, surplus working hours corresponding to the producible product models of the bottleneck apparatuses to be allocated;

wherein a step of determining, according to the spare working hour, the adjustment rate of the bottleneck apparatus to be adjusted comprises:

determining, by accessing the production scheduling database stored in the memory and executing the scheduling optimization program on the processor, the producible product models of the bottleneck apparatus to be adjusted and the producible product models corresponding to the bottleneck apparatuses to be allocated, and determining a co-produced product model of the bottleneck apparatus to be adjusted and the bottleneck apparatus to be allocated;

obtaining, by accessing the production scheduling database stored in the memory and executing the scheduling optimization program on the processor, planned working hours corresponding to co-produced product models of the bottleneck apparatus to be adjusted, and determining a total co-production working hour of the bottleneck apparatus to be adjusted; and inputting the spare working hour of the bottleneck apparatus to be adjusted and the total co-production working hour of the bottleneck apparatus to be adjusted into a preset adjustment rate formula, and automatically determining the adjustment rate of the bottleneck apparatus to be adjusted by executing a non-transitory computer-readable instruction configured to apply the preset adjustment rate formula, wherein the preset adjustment rate formula is expressed as follows:

$$k = \frac{T_{spare}}{T_n} \times 100\%;$$

k denotes the adjustment rate of the bottleneck apparatus to be adjusted, $T_{spare}$ denotes the spare working hour, and $T_n$ denotes the total co-production working hour; and wherein a step of allocating, based on the adjustment rate and the total surplus working hour, the working hours of the producible product models of the product cluster to the corresponding bottleneck apparatuses to be allocated comprises:

determining, by accessing the production scheduling database stored in the memory and executing the scheduling optimization program on the processor, based on the spare working hour of the bottleneck apparatus to be adjusted, product spare working hour of the producible product models of the bottleneck apparatus to be adjusted;

processing, based on a preset adjustment formula, the product spare working hour of the producible product model and the adjustment rate of the bottleneck apparatus to be adjusted, and automatically determining working hours to be allocated of the producible product models of the bottleneck apparatus to be adjusted by executing the non-transitory computer-readable instruction configured to apply the preset adjustment formula; wherein the preset adjustment formula is expressed as follows: $T_{adjust} = k \times T_{spare_i}$; $T_{adjust}$ denotes the working hours to be allocated, and $T_{spare_i}$ denotes the product spare working hour of the producible product model;

inputting the total surplus working hour of the bottleneck apparatuses to be allocated, the surplus working hours of each bottleneck apparatus to be allocated and the working hours to be allocated of the producible product models into a preset distribution formula, determining received working hours of the apparatuses to be allocated, for producing products of the producible product models based on the received working hours; wherein the preset distribution formula is expressed as follows:

$$T_{P_{ij}} = \frac{T_{P_j}}{\sum_j T_{P_j}} \times T_{adjust};$$

$T_{P_{ij}}$ denotes the received working hours of the apparatuses to be allocated, $\sum_i T_{P_j}$ denotes the total surplus working hour, and $T_{P_j}$ denotes the surplus working hours of each bottleneck apparatus to be allocated;

determining, by accessing the production scheduling database stored in the memory and executing the scheduling optimization program on the processor, an optimized production schedule for the plurality of bottleneck apparatuses to be allocated and the bottleneck apparatus to be adjusted, wherein the optimized production schedule includes updated working hour allocations to be implemented across the apparatus cluster and is used to control operational commands for the corresponding apparatuses to cause a transformation in the production state of a manufacturing environment;

receiving, by the production control system, in real time, sensor outputs computed in real time by processing circuitry embedded in respective ones of a plurality of apparatus-side hardware sensors coupled to the current bottleneck apparatuses, the sensor outputs being calculated from operating-state signals and indicative of an apparatus-state metric comprising at least one of: an available working hour, a current apparatus load rate, or a co-production working hour for a producible product model;

transmitting, by the production control system, in real time and based on the received sensor outputs, control commands that implement the optimized production schedule to automatically adjust working loads of the bottleneck apparatus to be adjusted and of one or more apparatuses of the plurality of bottleneck apparatuses to be allocated; and iteratively repeating determining the bottleneck apparatuses and reallocating working hours until all apparatus load rates fall within the preset threshold and forming a closed-loop feedback optimization process.

2. The method for real-time optimizing production scheduling based on the capacity of the bottleneck apparatus according to claim 1, wherein after a step of determining whether the apparatus load rates of the current bottleneck apparatuses exceed the preset threshold, the method further comprises:

arranging the current bottleneck apparatuses in sequence based on the apparatus load rates under the condition that the apparatus load rates of the current bottleneck apparatuses are less than the preset threshold, to obtain an apparatus load rate sequence of the current bottleneck apparatuses;

obtaining, by accessing the production scheduling database stored in the memory and executing the scheduling optimization program on the processor, a median load rate and a maximum load rate from the apparatus load rate sequence, determining a difference between the maximum load rate and the median load rate, and determining, under a condition that the difference exceeds a preset difference threshold, a current bottleneck apparatus corresponding to the maximum load rate as the bottleneck apparatus to be adjusted;

obtaining, by accessing the production scheduling database stored in the memory and executing the scheduling optimization program on the processor, the apparatus cluster and the product cluster corresponding to the bottleneck apparatus to be adjusted, inputting, into a preset deep learning network, the difference, surplus working hours of bottleneck apparatuses to be allocated that correspond to product models of the product cluster and load rates of the corresponding bottleneck apparatuses to be allocated, outputting working hours to be allocated that correspond to products of the bottleneck apparatus to be adjusted; and obtaining, by accessing the production scheduling database stored in the memory and executing the scheduling optimization program on the processor, a total surplus working hour of the bottleneck apparatuses to be allocated in the product cluster, determining, based on the total surplus working hour and the surplus working hours, a working hour allocation rate of the bottleneck apparatuses to be allocated, and allocating, according to the working hour allocation rate, the working hours to be allocated.

3. The method for real-time optimizing production scheduling based on the capacity of the bottleneck apparatus according to claim 1, wherein a step of obtaining the current work-break mechanism of the target enterprise and the apparatus load rates of the current bottleneck apparatuses comprises:

obtaining, by accessing the production scheduling database stored in the memory and executing the scheduling optimization program on the processor, influence data related to the apparatus load rates based on the preset database of the target enterprise; wherein the influence data comprise: the current work-break mechanism, a quantity of the current bottleneck apparatuses, a planned production quantity, a unit product working hour and a planned working day;

determining, by accessing the production scheduling database stored in the memory and executing the scheduling optimization program on the processor, a daily working hour of the target enterprise according to the current work-break mechanism, and determining available working hours of the current bottleneck apparatuses based on the quantity of the current bottleneck apparatuses, the planned working day and the daily working hour;

determining, by accessing the production scheduling database stored in the memory and executing the scheduling optimization program on the processor, planned working hours of the current bottleneck apparatuses according to the planned production quantity and the unit product working hour; and determining, by accessing the production scheduling database stored in the memory and executing the scheduling optimization program on the processor, the apparatus load rates of the current bottleneck apparatuses based on the available working hours and the planned working hours.

4. The method for real-time optimizing production scheduling based on the capacity of the bottleneck apparatus according to claim 1, wherein after a step of determining, according to the spare working hour, the adjustment rate of the bottleneck apparatus to be adjusted, the method further comprises:

determining, by accessing the production scheduling database stored in the memory and executing the scheduling optimization program on the processor, whether the adjustment rate exceeds a preset adjustment rate threshold; wherein the preset adjustment rate threshold is 100%; and determining, by accessing the production scheduling database stored in the memory and executing the scheduling optimization program on the processor, that the adjustment rate equals the preset adjustment rate threshold under a condition that the adjustment rate exceeds the preset adjustment rate threshold.

5. The method for real-time optimizing production scheduling based on the capacity of the bottleneck apparatus according to claim 3, wherein after the step of allocating the working hours of the producible product models of the product cluster to the corresponding bottleneck apparatuses to be allocated, the method further comprises:

implementing production scheduling optimization of the current bottleneck apparatuses in the target enterprise through iterative allocation of an apparatus of the current bottleneck apparatuses that has the highest apparatus load rate and exceeds the preset threshold;

determining, by accessing the production scheduling database stored in the memory and executing the scheduling optimization program on the processor, optimized apparatus load rates corresponding to the current bottleneck apparatuses after the production scheduling optimization;

obtaining, by accessing the production scheduling database stored in the memory and executing the scheduling optimization program on the processor, a current spare working hour of the current bottleneck apparatus under a condition that the apparatus load rate exceeds the preset threshold;

determining, by accessing the production scheduling database stored in the memory and executing the scheduling optimization program on the processor, spare product quantities of producible product models of the current bottleneck apparatus based on the spare working hour and the unit product working hour; and obtaining, by accessing the production scheduling database stored in the memory and executing the scheduling optimization program on the processor, upstream and downstream enterprises in a supply chain where the target enterprise is located, determining an assistant enterprise corresponding to the target enterprise based on associated enterprises of the upstream and downstream enterprises, and producing products of the spare product quantity gap based on the assistant enterprise.

6. A device for real-time optimizing production scheduling based on a capacity of a bottleneck apparatus, comprising:

a processor, and a memory configured to store a computer-executable instruction, wherein the computer-executable instruction causes the processor to execute a method for optimizing production scheduling based on a capacity of a bottleneck apparatus, comprising:

obtaining a current work-break mechanism of a target enterprise and apparatus load rates of current bottleneck apparatuses, and determining whether the apparatus load rates of the current bottleneck apparatuses exceed a preset threshold under a condition that the current work-break mechanism is an extreme work-break mechanism; wherein the extreme work-break mechanism is a work-break mechanism combining a three-shift mode with a natural-day working mode;

when the apparatus load rates of the current bottleneck apparatuses exceed the preset threshold, determining an apparatus that has a highest apparatus load rate as a bottleneck apparatus to be adjusted, and obtaining, according to a production schedule of the target enterprise, a plurality of producible product models corresponding to the bottleneck apparatus to be adjusted and a plurality of bottleneck apparatuses to be allocated that correspond to an equal model product as the bottleneck apparatus to be adjusted; wherein an apparatus load rate of the bottleneck apparatus to be allocated is less than or equal to the preset threshold;

determining, based on the plurality of bottleneck apparatuses to be allocated, an apparatus cluster corresponding to the bottleneck apparatus to be adjusted, wherein each bottleneck apparatus of the current bottleneck apparatuses produces one or more product models, wherein each bottleneck apparatus of the plurality of bottleneck apparatuses to be allocated is determined based on whether the bottleneck apparatus produces at least one product model which is the same as at least one product model produced by the bottleneck apparatus to be adjusted, and determining, according to products co-produced and in parallel by the bottleneck apparatus to be adjusted and the plurality of bottleneck apparatuses to be allocated, a product cluster corresponding to the bottleneck apparatus to be adjusted; and obtaining a spare working hour of the bottleneck apparatus to be adjusted and a total surplus working hour of the bottleneck apparatuses to be allocated in the apparatus cluster, determining, according to the spare working hour, an adjustment rate of the bottleneck apparatus to be adjusted, and allocating, based on the adjustment rate and the total surplus working hour, working hours of producible product models of the product cluster to corresponding bottleneck apparatuses to be allocated;

wherein a step of obtaining the spare working hour of the bottleneck apparatus to be adjusted and the total surplus working hour of the bottleneck apparatuses to be allocated in the apparatus cluster comprises:

determining the spare working hour of the bottleneck apparatus to be adjusted according to a difference between a planned working hour and an available working hour of the bottleneck apparatus to be adjusted; and determining, according to differences between planned working hours and available working hours of the bottleneck apparatuses to be allocated in the apparatus cluster, surplus working hours of the bottleneck apparatuses to be allocated, and determining the total surplus working hour of the apparatus cluster based on the surplus working hours of the bottleneck apparatuses to be allocated;

wherein after the step of obtaining the spare working hour of the bottleneck apparatus to be adjusted and the total surplus working hour of the bottleneck apparatuses to be allocated in the apparatus cluster, the method further comprises:

obtaining, based on a preset database, production proportions of producible product models of the bottleneck apparatuses to be allocated; and determining, based on the production proportions and the total surplus working hour of the bottleneck apparatus to be allocated, surplus working hours corresponding to the producible product models of the bottleneck apparatuses to be allocated;

wherein a step of determining, according to the spare working hour, the adjustment rate of the bottleneck apparatus to be adjusted comprises:

determining the producible product models of the bottleneck apparatus to be adjusted and the producible product models corresponding to the bottleneck apparatuses to be allocated, and determining a co-produced product model of the bottleneck apparatus to be adjusted and the bottleneck apparatus to be allocated;

obtaining planned working hours corresponding to co-produced product models of the bottleneck apparatus to be adjusted, and determining a total co-production working hour of the bottleneck apparatus to be adjusted; and inputting the spare working hour of the bottleneck apparatus to be adjusted and the total co-production working hour of the bottleneck apparatus to be adjusted into a preset adjustment rate formula, and automatically determining the adjustment rate of the bottleneck apparatus to be adjusted by executing a non-transitory computer-readable instruction configured to apply the preset adjustment rate formula, wherein the preset adjustment rate formula is expressed as follows:

$$k = \frac{T_{spare}}{T_n} \times 100\%;$$

k denotes the adjustment rate of the bottleneck appa-
ratus to be adjusted, $T_{spare}$ denotes the spare working
hour, and $T_n$ denotes the total co-production working
hour; and wherein a step of allocating, based on the adjustment rate
and the total surplus working hour, the working hours
of the producible product models of the product cluster
to the corresponding bottleneck apparatuses to be allo-
cated comprises:

determining, based on the spare working hour of the
bottleneck apparatus to be adjusted, product spare
working hour of the producible product models of the
bottleneck apparatus to be adjusted;

processing, based on a preset adjustment formula, the
product spare working hour of the producible product
model and the adjustment rate of the bottleneck appa-
ratus to be adjusted, and automatically determining
working hours to be allocated of the producible product
models of the bottleneck apparatus to be adjusted by
executing the non-transitory computer-readable
instruction configured to apply the preset adjustment
formula; wherein the preset adjustment formula is
expressed as follows: $T_{adjust} = k \times T_{spare_i}$; $T_{adjust}$ denotes
the working hours to be allocated, and $T_{spare_i}$ denotes
the product spare working hour of the producible
product model;

inputting the total surplus working hour of the bottleneck
apparatuses to be allocated, the surplus working hours
of each bottleneck apparatus to be allocated and the
working hours to be allocated of the producible product
models into a preset distribution formula, automatically
determining received working hours of the apparatuses
to be allocated, for producing products of the produc-
ible product models based on the received working
hours by executing the non-transitory computer-read-
able instruction configured to apply the preset distri-
bution formula; wherein the preset distribution formula
is expressed as follows:

$$T_{P_{ij}} = \frac{T_{P_j}}{\sum_j T_{P_j}} \times T_{adjust};$$

$T_{P_{ij}}$ denotes the received working hours of the appara-
tuses to be allocated, $\sum_j T_{P_j}$ denotes the total surplus
working hour, and $T_{P_j}$ denotes the surplus working
hours of each bottleneck apparatus to be allocated;

determining an optimized production schedule for the
plurality of bottleneck apparatuses to be allocated and
the bottleneck apparatus to be adjusted; and iteratively repeating determining the bottleneck appara-
tuses and reallocating working hours until all apparatus
load rates fall within the preset threshold and forming
a closed-loop feedback optimization process; and a plurality of sensors respectively coupled to the current
bottleneck apparatuses and communicatively coupled
to the processor, each sensor including processing
circuitry configured to acquire, in real time, operating
data of a corresponding apparatus and to calculate, in
real time, a sensor output indicative of at least one of:
an available working hour, an apparatus load rate, or a co-production working hour; wherein the computer-
executable instruction further causes the processor to
receive the sensor outputs, update the production
scheduling database based on the sensor outputs, and,
according to the optimized production schedule, issue
control commands to controllers of the apparatus clus-
ter to adjust working loads of the apparatuses by
reassigning working hours of the producible product
models among the apparatuses in real time.

7. A non-volatile storage medium, storing a computer-
executable instruction, wherein the computer-executable
instruction executes a method for real-time optimizing pro-
duction scheduling based on a capacity of a bottleneck
apparatus, comprising:

obtaining a current work-break mechanism of a target
enterprise and apparatus load rates of current bottle-
neck apparatuses, and determining whether the appa-
ratus load rates of the current bottleneck apparatuses
exceed a preset threshold under a condition that the
current work-break mechanism is an extreme work-
break mechanism; wherein the extreme work-break
mechanism is a work-break mechanism combining a
three-shift mode with a natural-day working mode;

when the apparatus load rates of the current bottleneck
apparatuses exceed the preset threshold, determining an
apparatus that has a highest apparatus load rate as a
bottleneck apparatus to be adjusted, and obtaining,
according to a production schedule of the target enter-
prise, a plurality of producible product models corre-
sponding to the bottleneck apparatus to be adjusted and
a plurality of bottleneck apparatuses to be allocated that
correspond to an equal model product as the bottleneck
apparatus to be adjusted; wherein an apparatus load rate
of the bottleneck apparatus to be allocated is less than
or equal to the preset threshold;

determining, based on the plurality of bottleneck appara-
tuses to be allocated, an apparatus cluster correspond-
ing to the bottleneck apparatus to be adjusted, wherein each bottleneck apparatus of the current bottle-
neck apparatuses produces one or more product mod-
els, wherein each bottleneck apparatus of the plurality
of bottleneck apparatuses to be allocated is determined
based on whether the bottleneck apparatus produces at
least one product model which is the same as at least
one product model produced by the bottleneck appa-
ratus to be adjusted, and determining, according to
products co-produced and in parallel by the bottleneck
apparatus to be adjusted and the plurality of bottleneck
apparatuses to be allocated, a product cluster corre-
sponding to the bottleneck apparatus to be adjusted;
and obtaining a spare working hour of the bottleneck appa-
ratus to be adjusted and a total surplus working hour of
the bottleneck apparatuses to be allocated in the appa-
ratus cluster, determining, according to the spare work-
ing hour, an adjustment rate of the bottleneck apparatus
to be adjusted, and allocating, based on the adjustment
rate and the total surplus working hour, working hours
of producible product models of the product cluster to
corresponding bottleneck apparatuses to be allocated;

wherein a step of obtaining the spare working hour of the
bottleneck apparatus to be adjusted and the total surplus
working hour of the bottleneck apparatuses to be allo-
cated in the apparatus cluster comprises:

determining the spare working hour of the bottleneck
apparatus to be adjusted according to a difference between a planned working hour and an available working hour of the bottleneck apparatus to be adjusted; and determining, according to differences between planned working hours and available working hours of the bottleneck apparatuses to be allocated in the apparatus cluster, surplus working hours of the bottleneck apparatuses to be allocated, and determining the total surplus working hour of the apparatus cluster based on the surplus working hours of the bottleneck apparatuses to be allocated;

wherein after the step of obtaining the spare working hour of the bottleneck apparatus to be adjusted and the total surplus working hour of the bottleneck apparatuses to be allocated in the apparatus cluster, the method further comprises:

obtaining, based on a preset database, production proportions of producible product models of the bottleneck apparatuses to be allocated; and determining, based on the production proportions and the total surplus working hour of the bottleneck apparatus to be allocated, surplus working hours corresponding to the producible product models of the bottleneck apparatuses to be allocated;

wherein a step of determining, according to the spare working hour, the adjustment rate of the bottleneck apparatus to be adjusted comprises:

determining the producible product models of the bottleneck apparatus to be adjusted and the producible product models corresponding to the bottleneck apparatuses to be allocated, and determining a co-produced product model of the bottleneck apparatus to be adjusted and the bottleneck apparatus to be allocated;

obtaining planned working hours corresponding to co-produced product models of the bottleneck apparatus to be adjusted, and determining a total co-production working hour of the bottleneck apparatus to be adjusted; and inputting the spare working hour of the bottleneck apparatus to be adjusted and the total co-production working hour of the bottleneck apparatus to be adjusted into a preset adjustment rate formula, and automatically determining the adjustment rate of the bottleneck apparatus to be adjusted by executing a non-transitory computer-readable instruction configured to apply the preset adjustment rate formula, wherein the preset adjustment rate formula is expressed as follows:

$$k = \frac{T_{spare}}{T_n} \times 100\%;$$

k denotes the adjustment rate of the bottleneck apparatus to be adjusted, $T_{spare}$ denotes the spare working hour, and $T_n$ denotes the total co-production working hour; and wherein a step of allocating, based on the adjustment rate and the total surplus working hour, the working hours of the producible product models of the product cluster to the corresponding bottleneck apparatuses to be allocated comprises:

determining, based on the spare working hour of the bottleneck apparatus to be adjusted, product spare working hour of the producible product models of the bottleneck apparatus to be adjusted;

processing, based on a preset adjustment formula, the product spare working hour of the producible product model and the adjustment rate of the bottleneck apparatus to be adjusted, and automatically determining working hours to be allocated of the producible product models of the bottleneck apparatus to be adjusted by executing the non-transitory computer-readable instruction configured to apply the preset adjustment formula; wherein the preset adjustment formula is expressed as follows: $T_{adjust} = k \times T_{spare_i}$; $T_{adjust}$ denotes the working hours to be allocated, and $T_{spare_i}$ denotes the product spare working hour of the producible product model;

inputting the total surplus working hour of the bottleneck apparatuses to be allocated, the surplus working hours of each bottleneck apparatus to be allocated and the working hours to be allocated of the producible product models into a preset distribution formula, automatically determining received working hours of the apparatuses to be allocated, for producing products of the producible product models based on the received working hours by executing the non-transitory computer-readable instruction configured to apply the preset distribution formula; wherein the preset distribution formula is expressed as follows:

$$T_{P_{ij}} = \frac{T_{P_j}}{\sum_j T_{P_j}} \times T_{adjust};$$

$T_{P_{ij}}$ denotes the received working hours of the apparatuses to be allocated, $\Sigma_j T_{P_j}$ denotes the total surplus working hour, and $T_{P_j}$ denotes the surplus working hours of each bottleneck apparatus to be allocated;

determining an optimized production schedule for the plurality of bottleneck apparatuses to be allocated and the bottleneck apparatus to be adjusted;

receiving, by a production control system, in real time, sensor outputs computed in real time by processing circuitry embedded in respective ones of a plurality of apparatus-side hardware sensors coupled to the current bottleneck apparatuses, the sensor outputs being calculated from operating-state signals and indicative of an apparatus-state metric comprising at least one of: an available working hour, a current apparatus load rate, or a co-production working hour for a producible product model;

transmitting, by the production control system, in real time and based on the received sensor outputs, control commands that implement the optimized production schedule to automatically adjust working loads of the bottleneck apparatus to be adjusted and of one or more apparatuses of the plurality of bottleneck apparatuses to be allocated; and iteratively repeating determining the bottleneck apparatuses and reallocating working hours until all apparatus load rates fall within the preset threshold and forming a closed-loop feedback optimization process.

* * * * *